United States Patent
Alesiani

(10) Patent No.: US 10,365,110 B2
(45) Date of Patent: Jul. 30, 2019

(54) METHOD AND SYSTEM FOR DETERMINING A PATH OF AN OBJECT FOR MOVING FROM A STARTING STATE TO AN END STATE SET AVOIDING ONE OR MORE OBSTACLES

(71) Applicant: NEC EUROPE LTD., Heidelberg (DE)

(72) Inventor: Francesco Alesiani, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/514,858

(22) PCT Filed: Sep. 30, 2014

(86) PCT No.: PCT/EP2014/070878
§ 371 (c)(1),
(2) Date: Mar. 28, 2017

(87) PCT Pub. No.: WO2016/050274
PCT Pub. Date: Apr. 7, 2016

(65) Prior Publication Data
US 2017/0219353 A1     Aug. 3, 2017

(51) Int. Cl.
*G01C 21/32*     (2006.01)
*G01C 21/20*     (2006.01)
(Continued)

(52) U.S. Cl.
CPC ............. *G01C 21/20* (2013.01); *G01C 21/00* (2013.01); *G05D 1/0212* (2013.01); *G05D 1/0217* (2013.01)

(58) Field of Classification Search
CPC .... G01C 21/20; G01C 21/34; G01C 21/3446; G01C 21/3461; G01C 21/28; G01C 21/26; G05D 1/0212; G08G 1/096811
(Continued)

(56) References Cited

U.S. PATENT DOCUMENTS 5,999,881 A * 12/1999 Law ................... G05B 19/4061
701/26
6,259,988 B1 * 7/2001 Galkowski ............. G01C 21/00
340/989

(Continued)

FOREIGN PATENT DOCUMENTS

DE    102013201935 A1    8/2014
EP        1733287 B1    12/2006
(Continued)

OTHER PUBLICATIONS

Webb Dustin J et al: "Kinodynamic RRT*: Asymptotically optimal motion planning for robots with linear dynamics", 2013 IEEE International Conference on Robotics and Automation (ICRA); May 6-10, 2013; Karlsruhe, Germany, IEEE, US, May 6, 2013 (May 6, 2013), pp. 5054-5061, XP032506031.

*Primary Examiner* — Shardul D Patel
(74) *Attorney, Agent, or Firm* — Leydig, Voit & Mayer, Ltd.

(57) ABSTRACT

A method for determining a path of an object for moving from a starting node representing a starting state to an end state includes a) determining a plurality of child nodes to a parent node, b) checking whether transitions from the parent node to each of the child nodes are free of obstacles and excluding partial paths that are not free of obstacles, c) computing a cost value for each of the non-excluded partial paths, d) adding the computed cost value to a cost value from the starting node to the parent node, e) adding an estimated or expected cost value for a partial path from each of the child nodes to an end node representing an end state, f) determining a lowest overall cost value and selecting a new parent node, and g) repeatedly performing steps a)-f) until at least one termination condition is fulfilled.

25 Claims, 12 Drawing Sheets

(51) Int. Cl.
*G05D 1/02* (2006.01)
*G01C 21/00* (2006.01)

(58) Field of Classification Search
USPC ................ 701/400, 533; 455/452.1; 370/338
See application file for complete search history.

(56) References Cited

U.S. PATENT DOCUMENTS

| | | | |
|---|---|---|---|
| 7,447,593 B2* | 11/2008 | Estkowski | G01C 21/20 700/250 |
| 7,822,064 B2* | 10/2010 | Thubert | H04W 76/12 370/468 |
| 2005/0216181 A1* | 9/2005 | Estkowski | G01C 21/20 701/411 |
| 2010/0082194 A1 | 4/2010 | Yabushita et al. | |
| 2011/0106306 A1* | 5/2011 | Kim | B25J 9/1664 700/246 |
| 2012/0165982 A1 | 6/2012 | Kim et al. | |

FOREIGN PATENT DOCUMENTS

| | | |
|---|---|---|
| EP | 2172825 A1 | 4/2010 |
| EP | 2458331 A2 | 5/2012 |
| JP | H 05297944 A | 11/1993 |
| JP | 2007249632 A | 9/2007 |
| JP | 2007531110 A | 11/2007 |
| JP | 2009025974 A | 2/2009 |
| JP | 2010231698 A | 10/2010 |
| JP | 2012189381 A | 10/2012 |
| JP | 2013045265 A | 3/2013 |
| WO | WO 2006022827 A2 | 3/2006 |
| WO | WO 2006080996 A2 | 8/2006 |

\* cited by examiner

METHOD AND SYSTEM FOR DETERMINING A PATH OF AN OBJECT FOR MOVING FROM A STARTING STATE TO AN END STATE SET AVOIDING ONE OR MORE OBSTACLES

CROSS REFERENCE TO RELATED APPLICATIONS

This application is a U.S. National Stage application under 35 U.S.C. § 371 of International Application No. PCT/EP2014/070878 filed on Sep. 30, 2014. The International Application was published in English on Apr. 7, 2016 as WO 2016/050274 A1 under PCT Article 21(2).

FIELD

The present invention relates to a method for determining a path of an object like a robot, etc. for moving from a starting state to an end state set comprising one or more end states via one or more nodes being each defined as an obstacle free state that has been explored, avoiding one or more obstacles.

The present invention further relates to a system for determining a path of an object like a robot, etc. for moving from a starting state to an end state set comprising one or more end states via one or more nodes being each defined as an obstacle free state that has been explored avoiding one or more obstacles.

Although applicable to any kind of object the present invention will be described with regard to robots.

BACKGROUND

Robots and Autonomous/Unmanned driving vehicles are two wide areas and systems affecting everyday life nowadays. Robots are used for industrial automation or for living assistance. Recently also drones have been introduced for military and civilian applications. Autonomous driving cars have shown high level of reliability and in the near future will be available for public use, while they are already used for non-public road use, as agriculture and mining application. Unmanned vehicles are also envisaged for crewless ships or spacecraft.

Other areas of applications include the medical sector when chirurgical instruments shall be moved among hard and soft tissues and vital organs. Other applications include military and space application where vehicles need to be moved avoiding obstacles.

For the above reasons the path or movement of such an object has to be planned including avoiding of obstacles. Path Planning is the area of Robotics devoted to the generation of a path between a starting state to a target final state set. The path shall consider robot/vehicle constraints and state evolution dynamics and shall live in the obstacle free set of state of the robot/vehicle.

In U.S. Pat. No. 7,447,593 B2 a path planning system and method for an object such as a vehicle is disclosed. The system provides a randomized adaptive path planning handling real-time path planning for a vehicle operating under kinodynamic constraints in dynamically changing and uncertain environments with probabilistic knowledge of vehicle and obstacle movement. In detail a tree built is performed by the following steps: Setting a root node to an initial vehicle state and checking if stopping conditions are satisfied. If not, perform a deterministic tree extension and a random tree extension. Based on the tree extensions a node is chosen that has not yet been chosen. Then it is checked whether the node has be extended or not. If not then the node is set to dead. If the node has been extended then it is checked whether kill conditions are satisfied or not and if the kill conditions are not satisfied then it is checked whether all nodes have been chosen or not. If not all nodes have been chosen, the node that has not been yet chosen is chosen. Otherwise it is again checked whether the stopping conditions are satisfied or not.

In U.S. Pat. No. 5,999,881 an automatic part planning system and method is disclosed. The system and method automatically finds collision-free part removal paths. The system sparsely samples the high-dimensional state space and maps the rest of the space using proximity assumptions. In more detail U.S. Pat. No. 5,999,881 checks whether a path connecting the start and destination states being totally contained within overlapping regions defined by spheres around the start state and the destination state is tested to determine if it collides with an obstacle. If an obstacle is encountered then the collision point where the obstacle intersects the region is determined and the current region and neighbor regions are adapted in their size such that the distance between its center to a closest collision point is lower. Then an obstacle free region is chosen as parent region from which to spawn a child region. The candidate point with the parent region is chosen as a center point of a child region and if the candidate point hits an obstacle then the radii of the regions are appropriately adjusted and a further candidate point or parent region is chosen repeatedly. If the candidate point does not hit an obstacle then a child region is created with a candidate point as its center point having a radius being less than the closest collision location in a list of collision points.

In WO 2006/080996 A2 a point-to-point path planning method is disclosed for determining a path for a vehicle, wherein a starting point and a termination point are defined and an obstacle detector detects one or more obstacles in a work area between the starting point and the termination point. A boundary zone is defined about each corresponding obstacle. Then candidate paths are identified between the starting point and the termination point. Each candidate path only intersects each boundary zone, one for each corresponding obstacle. An economic cost is estimated for traversing each candidate path or a portion thereof between the starting point and the termination point. A preferential path is selected from the identified candidate paths based on the preferential path being associated with the lowest estimated economic cost.

Other path planning methods and algorithms are for example disclosed in the non-patent literature of S. Karaman, E. Frazzoli, "Sampling-based algorithms for optimal motion planning", Int. J. of Robotics Research 30(7): 846-894, 2011 or in the non-patent literature of Webb, D. and van den Berg, J. (2013), "Kinodynamic RRT: Asymptotically optimal motion planning for robots with linear dynamics", pp. 5054-5061.

SUMMARY

In an embodiment, the present invention provides a method for determining a path of an object for moving from a starting node representing a starting state via one or more nodes to an end state of an end state set including one or more end states each being defined as an obstacle free state that has been explored avoiding one or more obstacles. The method includes a) determining a plurality of child nodes to a parent node, wherein the plurality of child nodes are within a distance from the parent node, b) checking whether transitions from the parent node to each of the child nodes are free of obstacles and excluding partial paths that are not free of obstacles, c) computing a cost value for each of the non-excluded partial paths, d) adding the computed cost value to a cost value from the starting node to the parent node, e) adding an estimated or expected cost value for a partial path from each of the child nodes to an end node representing an end state, f) determining a lowest overall cost value from the cost values determined according to d)-e) and selecting a child node associated with the determined lowest overall cost value as a new parent node, and g) repeatedly performing steps a)-f) until at least one termination condition is fulfilled, wherein the at least one termination condition includes the selected child node being within a predetermined distance to the end node representing the end state.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
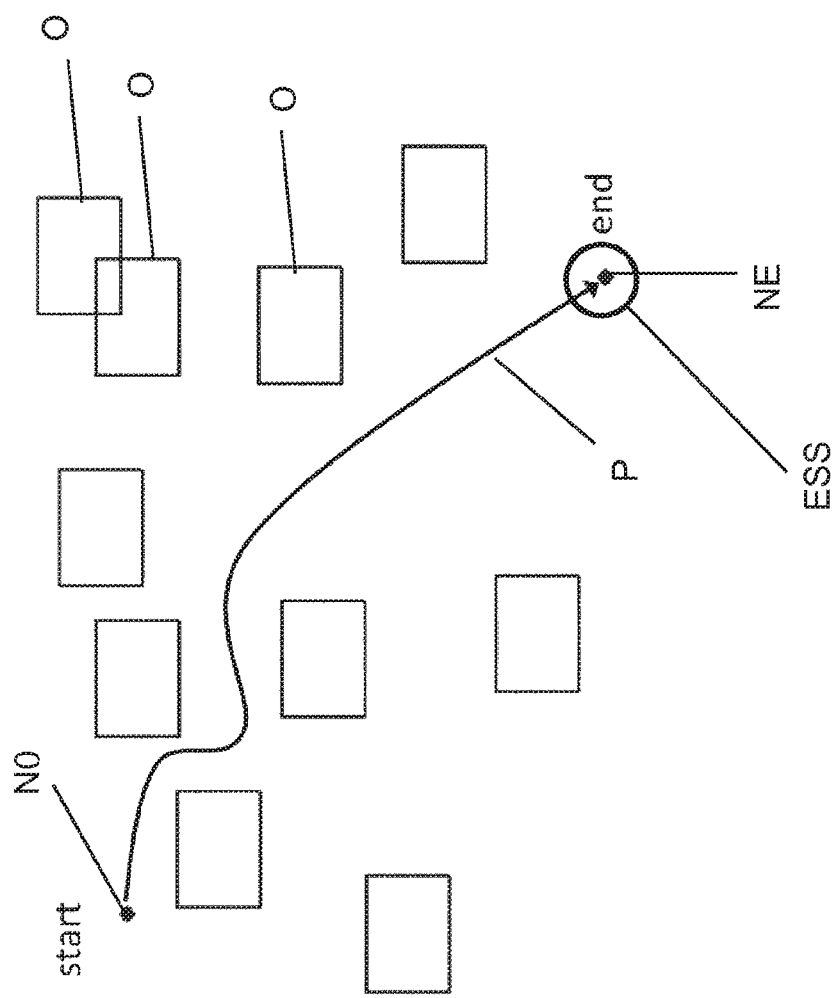
FIG. 1 shows schematically the underlying problem to determine a path.

However one of the drawbacks of conventional methods and systems is to find a path in a reasonable amount of time when the space of state grows and in particular in presence of unknown shaped obstacles. A further problem is that the path should be tractable when obstacles are moving in the area of interest, i.e. considering a time-component. Another problem is that conventional path planning systems focus on achieving asymptotic optimality or fast growing data structures, however neglecting a bounded optimal path.

A method and a system for determining a path of an object providing a fast and error bounded solution to the problem of determining a path of an object are described herein.

A method and a system for determining a path of an object which can be used to a large number of different applications are described herein.

A method and a system for determining a path of an object being easy to implement and cost-effective are described herein.

A method according to an embodiment of the invention for determining a path of an object like a robot, etc. for moving from a starting state to an end state set comprising one or more end states via one or more nodes each being defined as an obstacle free state that has been explored avoiding one or more obstacles is characterized by the steps of a) Determining a plurality of child nodes to a parent node, wherein the starting node representing the starting state is the parent node when step a) is performed for the first time, and wherein the child nodes are within a certain distance to the parent node, b) Checking whether the transitions from the parent node to each of the child nodes are free of obstacles, and if not the corresponding child node and this partial path from the parent node to this child node is excluded, c) Computing a cost value for each of said partial paths, d) Add said computed cost value to a cost value from the starting node to the parent node, e) Add an estimated or expected cost value for the partial paths from each of the child nodes to an end node representing an end state, f) Determining the lowest overall cost value from the determined cost values according to steps d)-f) and selecting the child node as new parent node associated with the determined lowest cost, and g) Repeated performing the steps a)-g) until at least one termination condition is fulfilled including the termination condition if a selected child node is within a pregiven distance to the end node.

A system for determining a path of an object like a robot, etc. for moving from a starting state to an end state set comprising one or more end states via one or more nodes each being defined as an obstacle free state that has been explored avoiding one or more obstacles is characterized by one or more processors adapted to or adapted to cooperate with each other to a) determine a plurality of child nodes to a parent node, wherein the starting node representing the starting state is the parent node when step a) is performed for the first time, and wherein the child nodes are within a certain distance to the parent node, b) to check whether the transitions from the parent node to each of the child nodes are free of obstacles, and if not the corresponding child node and this partial path from the parent node to this child node is excluded, c) compute a cost value for each of said partial paths, d) add said computed cost value to a cost value from the starting node to the parent node, e) add an estimated or expected cost value for the partial paths from each of the child nodes to an end node representing an end state, f) determine the lowest overall cost value from the determined cost values according to steps d)-f) and selecting the child node as new parent node associated with the determined lowest cost, and to g) repeated performing the steps a)-g) until at least one termination condition is fulfilled including the termination condition if a selected child node is within a pregiven distance to the end node.

Embodiments of the present invention preferably use a local growing tree search with bounded approximated optimal cost and iteration solution.

The term "cost" can be understood herein in its broadest sense and may include but is not limited to distance, time, energy, pollution and/or economic cost, etc.

According to an embodiment of the invention it has been recognized that a path for objects like a robot, vehicle, etc. is provided avoiding obstacles wherein the shape of the obstacles may be not known in advance and possibly moving in time.

According to an embodiment of the invention it has been further recognized that the determined path respects a bounded error with respect to an optimal cost path computed in a bounded time.

According to an embodiment of the invention it has been even further recognized that the present invention can be applied to many application areas, for example starting from the cooperative autonomous driving vehicle to robot or drone obstacle free movement to medical precision control.

According to an embodiment of the invention it has been even further recognized that the present invention is flexible in terms of enabling extensions such as that an asymptotical optimal convergence may be enabled.

According to a preferred embodiment a lower bound value for the real cost from the child node to the end state set is determined and used as said estimated or expected cost in step e). This enables to explore the obstacle free space only if the cost is not higher than a lower estimated cost at the exploration time. The cost of a path could be approximated by the actual cost up to an intermediate state plus a lower bound of the real cost to the end state. This enables to estimate a cost-effective path within a limited amount of time. An example of lower estimated cost is the cost associated with a solution, i.e. path, that does not consider obstacles and/or only include part of the real total cost, as for example only the distance.

According to a further preferred embodiment for determining child nodes a parent covering space is selected and the child nodes are generated locally such that the child nodes cover the parent covering space with their individual covering space to a predetermined parent extent, wherein the individual covering spaces do not overlap with each other. This enables to explore the space around each explored node effectively. Obstacles can be determined in a fast way with sufficient precision.

According to a further preferred embodiment the form of the individual covering space for child nodes and/or the parent covering space for parent nodes has spherical form having a predefined radius. This enhances even more the effectiveness for computation, since spheres are symmetrical and can be described with only two variables, i.e. location of the center and radius.

According to a further preferred embodiment for generating the child nodes locally a limited number of directions from the center of the parent covering space is generated and used for covering the parent covering space by generating child nodes in these directions. This enables for example to select or prefer certain directions. Thus, flexibility is enhanced. The selection of some directions allows also to perform a local search along these directions to optimal place a new sphere as an example of an individual covering space.

According to a further preferred embodiment for step b) in case of a determined obstacle, the child nodes are generated within the parent covering space such that the part of the parent covering space being free of the obstacle is covered to a certain extent. This enhances the covering of the obstacle free space in case an object is present.

According to a further preferred embodiment for step b) in case of two or more determined obstacles, the minimum obstacle distance is determined between two obstacles and the maximum extent in a direction of the minimum distance of the individual covering space is set below the minimum obstacle distance. Then for example a sphere having a radius half of the minimum obstacle distance may still pass through both obstacles. This enables to detect paths between close obstacles.

According to a further preferred embodiment the closest node to the current parent node is determined and if the closest node lies within an individual covering space of a child node centered at the current parent node the overall cost value including the cost for the partial path from the current parent node to said closest node for the closest node is determined and if the cost is lower than the overall cost of the current parent node then the closest node is selected as new parent node. This ensures that if a node is closer than for example a minimum radius when the individual covering space is a sphere without exploring further nodes a further optimization in the path can be provided.

According to a further preferred embodiment parameters defining the shape of the parent covering space and/or the individual covering space, preferably in form of spheres, are determined randomly, preferably wherein the radius' of the spheres are determined randomly, according to one or more probability distributions. This enables to find a suitable path in shorter time by reducing the accuracy although sufficient accuracy can be kept. The effective radius is then the average between the minimum and the maximum value or in general is the mean of the distribution of the radius of the sphere for example. The minimum radius is the minimum radius of the distribution. The smallest distance between obstacles that will be passed using randomization is half the larger radius determined from the probability distribution.

According to a further preferred embodiment in case of spheres as individual covering spaces and/or parent covering spaces the corresponding radius is determined to be lower than half the minimum distance between said two or more obstacles. This allows selecting the minimum radius such that a sphere with such a radius can pass the smallest distance between obstacles.

According to a further preferred embodiment for implementing a time evolution of obstacles, preferably moving of obstacles, the obstacles and the nodes along the path are implemented with a further dimension in time. For example the state space between the starting point and the end point includes then also a time-dimension. For instance obstacles in form of a rectangle in a two dimensional space have a form of a cuboid extending the rectangle in a third dimension. This allows in an easy way to implement time evolution of obstacles.

According to a further preferred embodiment for implementing a time evolution of obstacles, preferably moving of obstacles, the states of the nodes are assigned a time interval indicating the time being free of obstacles. For instance the intervals may be numbered from 1. While exploring a node the time interval at each visited node is stored. The next node can be visited only if the next interval is compatible with the starting state interval plus the state movement time and when the movement is free of obstacles. While exploring a node the cost is updated where the cost uses the earlier visiting time. To efficiently store the movement it can be bound in predefined time steps with a multi-dimensional rectangle of minimal volume comprising the moving object.

According to a further preferred embodiment when the evolution from the starting state to the end state is kinodynamic-based the cost between two states of a parent node and a child node is computed by performing a local optimization task. This enables to calculate the cost between two states or nodes very efficiently.

According to a further preferred embodiment steps a)-g) are also performed in a reverse manner starting from the end node as initial parent node backwards to the starting node, wherein the termination condition is fulfilled when nodes of both paths one originating at the starting node and the other originating at the end node are within the certain distance to each other, wherein the end state set comprising only one end state. This provides an alternative way to determine a path between the starting point and the end point enabling a faster determination of a path between the starting node and the end node.

According to a further preferred embodiment for implementing a time evolution of states, nodes and obstacles, preferably moving obstacles, time is subtracted to account reverse time direction. This allows an easy implementation of a time evolution of states, nodes and obstacles, preferably moving of obstacles and easy implementation of a time evolution for double propagating trees for determining a path between the starting node and the end node with time being subtracted to account reverse time direction.

According to a further preferred embodiment for each new parent and/or child node the nodes are added along the direct path to the destination and determination condition is only applied when the end node set is reached by a partial path with steps a)-g) performed and the new parent node being a node representing an end state of the end state set with lower overall cost. This enables to implement a tentative to reach directly the destination at each new parent node. The nodes along the direct path to the destination are simply added. The termination condition is preferably not fulfilled if the end state/end node is reached by a path comprising a direct connecting extension. The reason is that there may exist paths adding a lower overall cost. The termination condition is only fulfilled when a path does not comprise an extension node when arriving at the end state/end node or when a queue—as described below—is empty or the predetermined number of iterations is reached.

According to a further preferred embodiment in case a path from the starting state to the end state set is found within a time boundary the remaining time is used applying the RRT*procedure for checking alternative paths with lower cost. This enables to optimize the found path further when a bounded ideal or optimal path is already found and some time is left, i.e. without violating a time constraint. A further advantage is that asymptotical optimality is achieved after the bounded error path is found. The RRT*-procedure is the asymptotically optimal RRT-procedure version, developed by Karaman and Frazzoli as disclosed in the non-patent literature "Sampling-based algorithms for optimal motion planning" as shown above.

According to a further preferred embodiment in case of multiple objects steps a)-g) are performed for a first object and then the steps a)-g) are performed for one or more second objects considering the determined path for the first object fixed to be an obstacle and wherein a common overall cost for all paths is determined. This enables in an easy way to implement a plurality of objects having to find a path from their respective starting node to the corresponding end node. An example of this is when quatrotors need to move simultaneously in an environment with obstacle. Then a common cost function is defined and the method according to an embodiment of the present invention is iterated for each robot/vehicle separately by considering the others robot vehicle path fixed. Cost may also include a factor link to a priority value of vehicles so that vehicles approaching from right may have a smaller penalty cost with respect to vehicles arriving from the left. The determination criteria may then be some convergence criteria, for example when there are no significant changes in the found path anymore or when a predefined number of iterations is reached.

According to a further preferred embodiment the common overall cost includes an interaction cost between a first and second object, preferably wherein the interaction cost decreases with a greater distance between the first and second object. This takes into account that any approach of the two objects results in a higher cost and therefore a collision is avoided.

According to a further preferred embodiment the center of the individual covering space and/or the parent covering space is assigned to a grid structure. This allows for example to put the center of a sphere on a regular and/or fixed grid. One of the advantages is that conflicts do not have to be checked, i.e. all positions of the nodes are fixed with each other and therefore individual covering areas in form of spheres may be chosen such that they do not overlap in any way. To provide flexibility some of the nodes on the grid may not be visited enabling at least some adaptability which nodes to be explored. For generating the grid any lattice or grid generation procedure may be used. For instance the lattice may be generated by a basis of linear independent vectors in the number of the dimension of the space.

According to a further preferred embodiment a threshold is used to specify how many nodes need to be connected for each node to obtain a path from the starting state to the end state set. This enables to reduce respectively limit the number of nodes from the starting node to the end node. This critical threshold can be used to decide how many spheres and nodes need to be connected for each node and average to obtain connectivity, i.e. to find at least one path. For example for a regular tree graph where all nodes have the same connectivity, i.e. the number of connected nodes equal to k, the critical probability threshold is 1/k. When the number of connected nodes is reduced a path may not actually be found when performing steps a)-g) or the error of the found path is not guaranteed to be within the given bound. To alleviate these two facts a number of visited nodes per node could be stored and previously undiscovered nodes may be further used either when more iterations are possible or when the destination has not been reached and no further node can be visited.

According to a further preferred embodiment a queue is used to indicate the cost values for each node, such that the node with the lowest expected cost value is used as the next node and the other nodes with a higher cost are ordered according to their expected cost value in the queue. This enables to provide a priority queue where nodes are inserted during the exploration. This priority queue returns and removes an element with a lower cost which is then used as a parent node.

According to a further preferred embodiment for performing steps b)-f) the overall cost value for the paths via each child node is subsequently determined and if an overall cost value via current child node is less than that of a prior child node then the current child node is selected as new parent node and the prior child node is reinserted into the queue. This enables in an easy and efficient way to determine a new parent node.

According to a further preferred embodiment for performing step a) the starting node is inserted into the queue. This initializes the iteration for determining the path in a very easy way.

FIG. 1 shows schematically the underlying problem to determine a path. In FIG. 1 an example problem is shown: A collision free path P between a start state N0 and an end state set ESS comprising an end node (NE) is to be found, wherein obstacles O—here in form of rectangles—are in general in between the starting state N0 and the end state set ESS.

Figure 2:
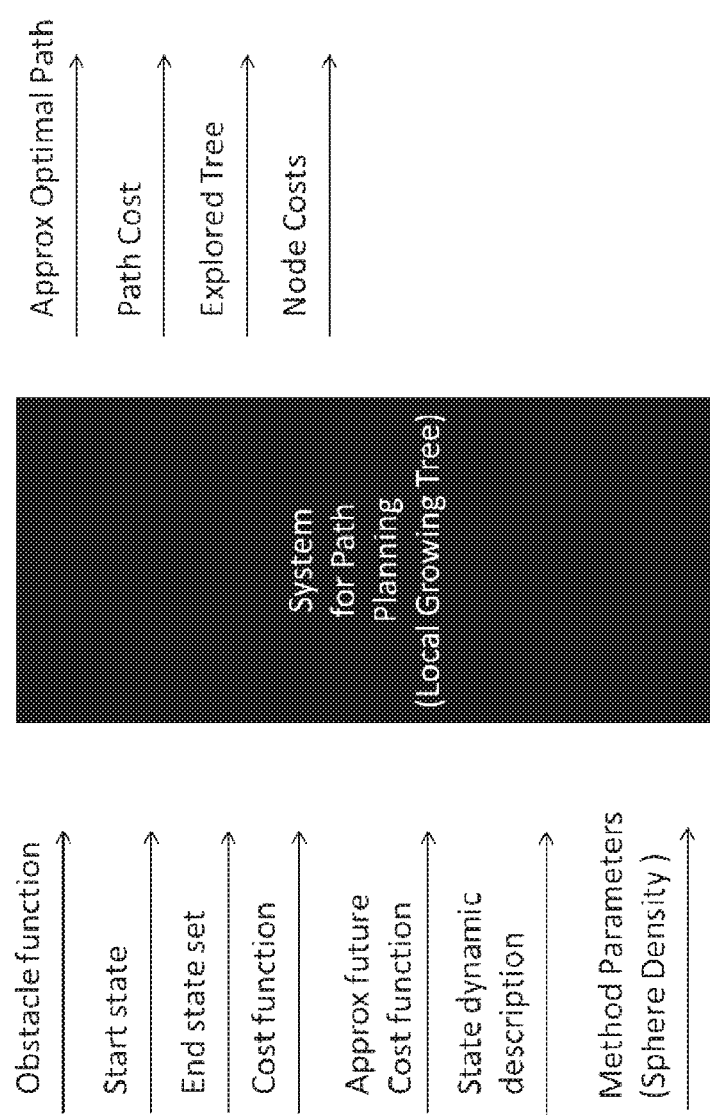
FIG. 2 shows a system according to a first embodiment of the present invention.

FIG. 2 shows a system according to a first embodiment of the present invention. In FIG. 2 an example of a system architecture for local growing trees with bounded approximated optimal cost is shown. As input parameters an obstacle function, the start state, the end state set, a cost function and approximation future cost function, a dynamic description of the states as well as other method parameters like densities of spheres ICS or the like are used. Then the system for path planning outputs an approximated optimal path, the cost of the found path, the explored tree and the node costs.

For computing a path, i.e. finding one or more paths between a starting state $x_s$ and a final state set $X_f$ a method according to an embodiment of the present invention is used enabling to avoid possibly time moving obstacles bounded by a so-called state evolution function. The path returned can be measured in terms of cost-function f(x) where f(x) is the cost to move from a starting state $x_s$ to the current state x. The cost of a path is approximated by the actual cost up to an intermediate state plus a lower bound of the real cost to the end state or end state set.

According to the invention the obstacle free space is explored only if the cost of a path is not higher than the lower estimated cost at the exploration time.

In more detail in the following it is assumed:

$$\exists h(x,y) : h(x,y) \leq f(x,y)$$

$$f(x,y|z) = f(x,z) + f(z,y)$$

where $f(x, y|z)$ is the cost of going from x to y, passing by z and h(x,y) is a lower bound of the real cost function $f(x,y)$. The approximated lower cost is $g(x_s, x_e|x) = f(x_s, x) + h(x,x_e)$ $x_s$, $x_e$ are the start and end states and x is a state along the path.

The proposed method comprises the use of a priority queue where nodes are inserted during exploration. The priority queue returns and removes the element with lower cost, where the cost is the expected cost $g(x_s, x)$.

Beginning from the starting state/starting node additional nodes are explored so that for each explored node—at the beginning it is only the starting node—new nodes CN0, CN1, CN2 approximately covering the nearby space with spheres ICS of radius $R_{min}$ are generated. The new nodes CN0, CN1, CN2 are generated locally until the sphere PCS of radius $R_{max}$ is covered with non-overlapping spheres ICS of radius $R_{min}$. This is preferably obtained by generating a sufficient but limited number of directions and then checking about neighbor nodes CN0, CN1, CN2. Neighbor nodes CN1, CN2 may be found using a searching function. On input of a radius R and a corresponding input node x all nodes CN1, CN2 are found within the sphere PCS centered at the current node CN0 and given radius. The returned nodes CN1, CN2 are preferably ordered by distance. Further only $N_n$ closest nodes CN0, CN1, CN2 can be checked with $N_n$ being a parameter to be chosen.

Figure 3:
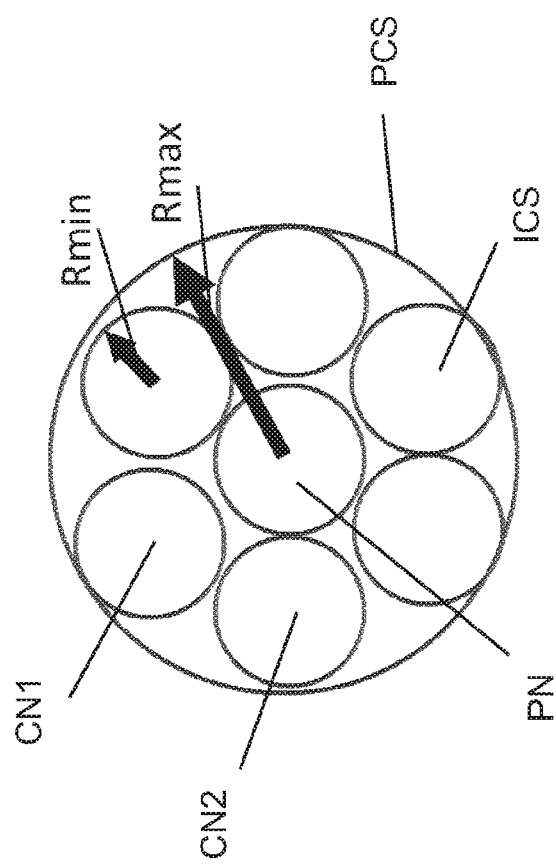
FIG. 3 shows a parent covering space and individual covering spaces in the form of spheres.

FIG. 3 shows a parent covering space and individual covering spaces in form of spheres. In FIG. 3 a generation of new nodes CN0, CN1, CN2 with individual covering spheres ICS is shown. The maximum number of the sphere ICS is defined by $$N_{max} = \frac{V_{max}}{V_{min}}$$

where $V_{max}, V_{min}$ are the volume of the d-dimensional sphere ICS. The maximum number of iterations $N_{iter, max}$ is given by the number of spheres of radium $R_{min}$ inside the hyper ellipsoid whose foci are the start state and the one or more end states and the sum of the distances is given by the cost of the optimal solution $$N_{iter,max} = \frac{V_{ellipse}}{V_{min}}$$

Figure 4:
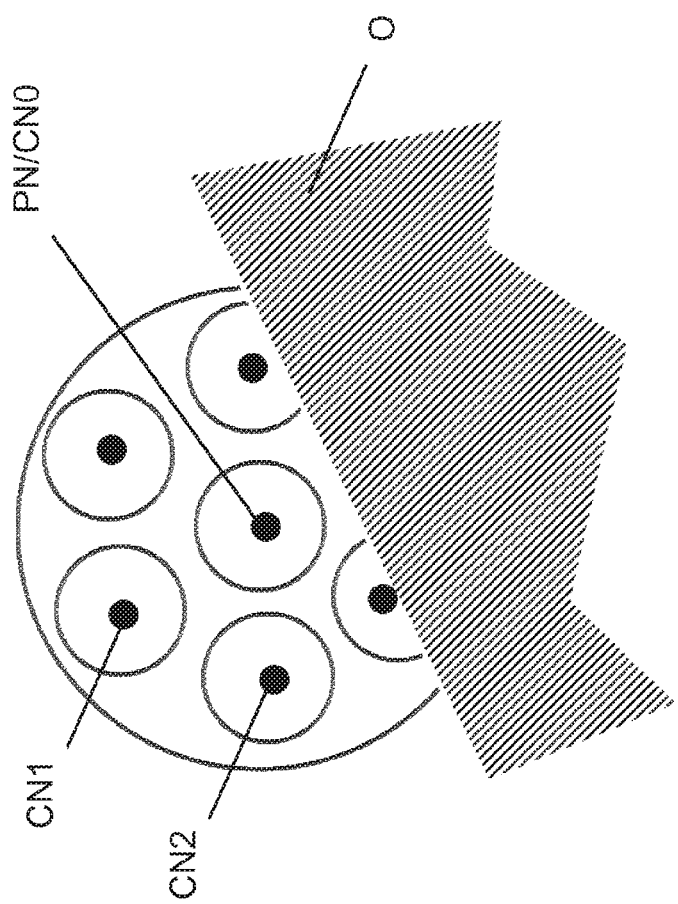
FIG. 4 shows a parent covering area partially blocked with an obstacle.

FIG. 4 shows the parent covering area partially blocked with an obstacle. In FIG. 4 the sphere PCS with radius $R_{max}$ is covered with the child nodes CN0, CN1, CN2 of radius $R_{min}$ when an obstacle O is present. When the exploration is executed close to an obstacle O, the nodes CN0, CN1, CN2 are generated considering the remaining space and attempting to cover the remaining space with the density given by the radius $R_{min}$ of the child nodes CN0, CN1, CN2.

Figure 5:
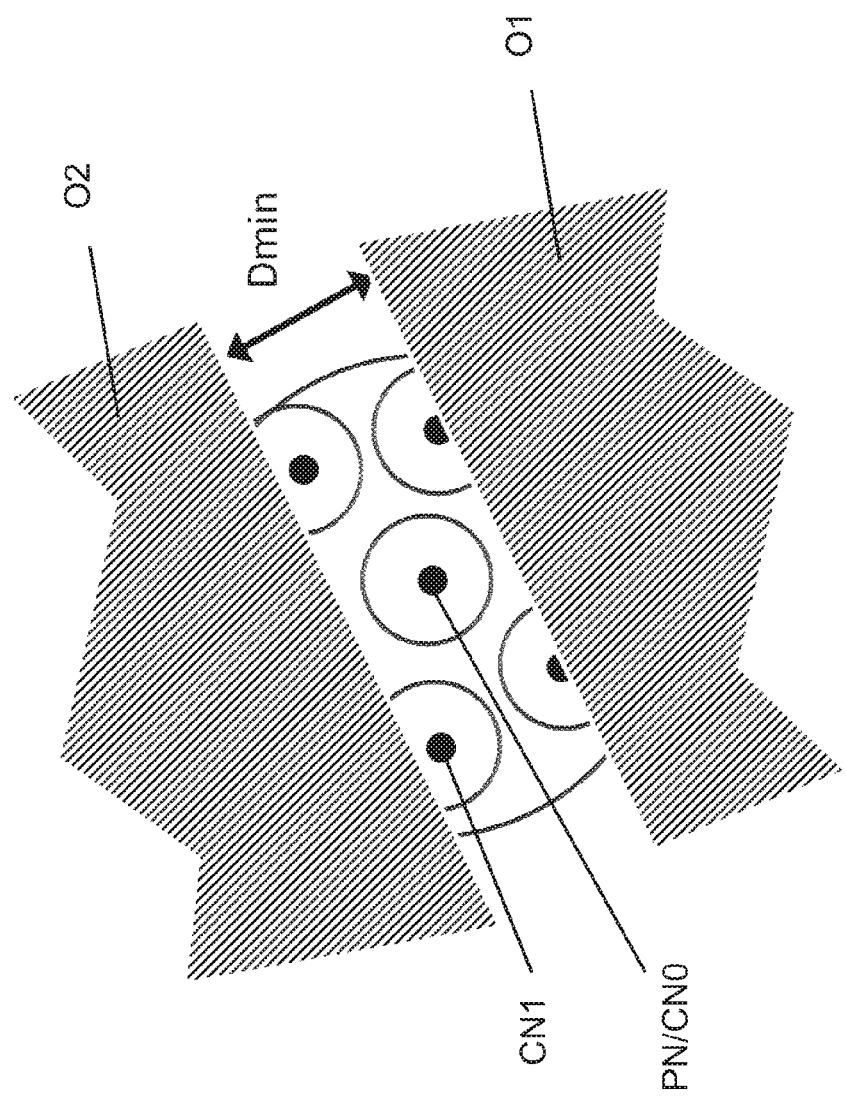
FIG. 5 shows a parent covering space partially blocked by two objects.

FIG. 5 shows a parent covering space partially blocked by two objects. In FIG. 5 spheres covering a narrow passage are shown. In more detail FIG. 5 shows the covering of a parent node space PCS when two obstacles O1, O2 are present. When the obstacles O1, O2 are very close to each other, the individual covering space ICS, i.e. the sphere could successfully pass if the radius of the sphere ICS—$R_{min}$—is approximately half the size of the smallest distance between the two obstacles O1, O2—$D_{min}$.

Figure 6:
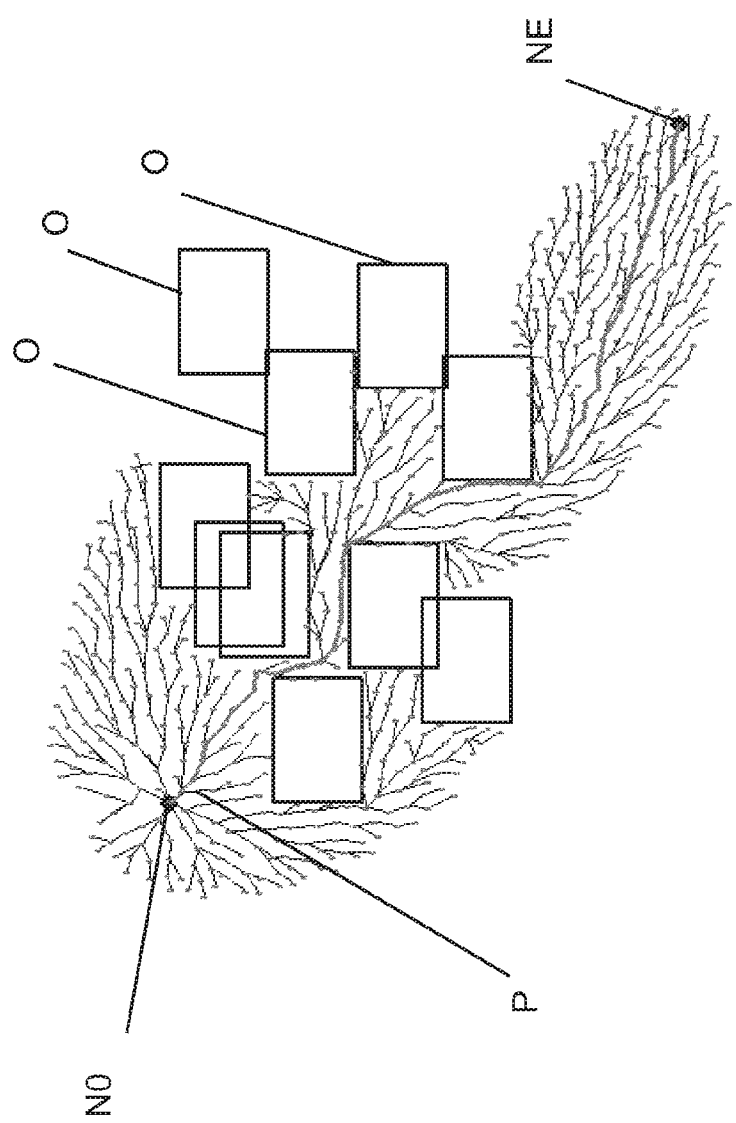
FIG. 6 shows a result of a determined path as a result of a method according to a second embodiment of the present invention.

FIG. 6 shows a result of a path determined by a method according to a second embodiment of the present invention. In FIG. 6 an example of a local growing tree or a path P starting from a starting node N0 to the end node NE with present obstacles O is shown. As it can be seen from FIG. 6 the circumference of all trees partially extrapolated in the areas with absent trees has the form of an ellipsoid. As it can also be seen from FIG. 6 the path P avoids all obstacles en route from the starting node N0 to the end node NE.

Figure 7:
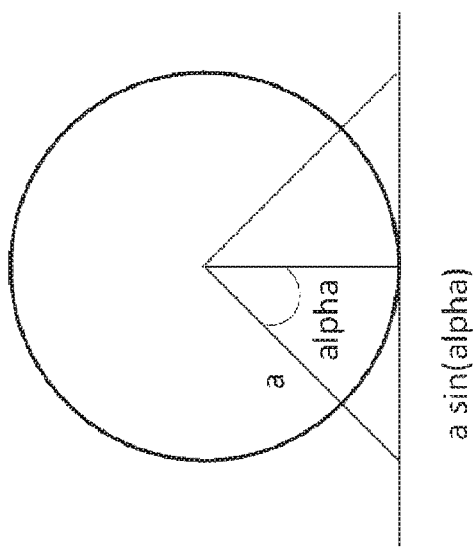
FIG. 7 shows schematically the maximum possible cost error when visiting the final node.

FIG. 7 shows schematically the maximum possible cost error when visiting the final node. In FIG. 7 a maximum error possible in cost when visiting the final node is shown. This error is due to the placement of the spheres whose center may not be placed along the optimal path. This accounts for an error of maximum 1/sin(45°)*L which is approximately 2 L where L is the length of the path along the nodes. The cost error depends on the actual cost function and its relationship with the length of the path. The actual error of the determined path is lower.

Figure 8:
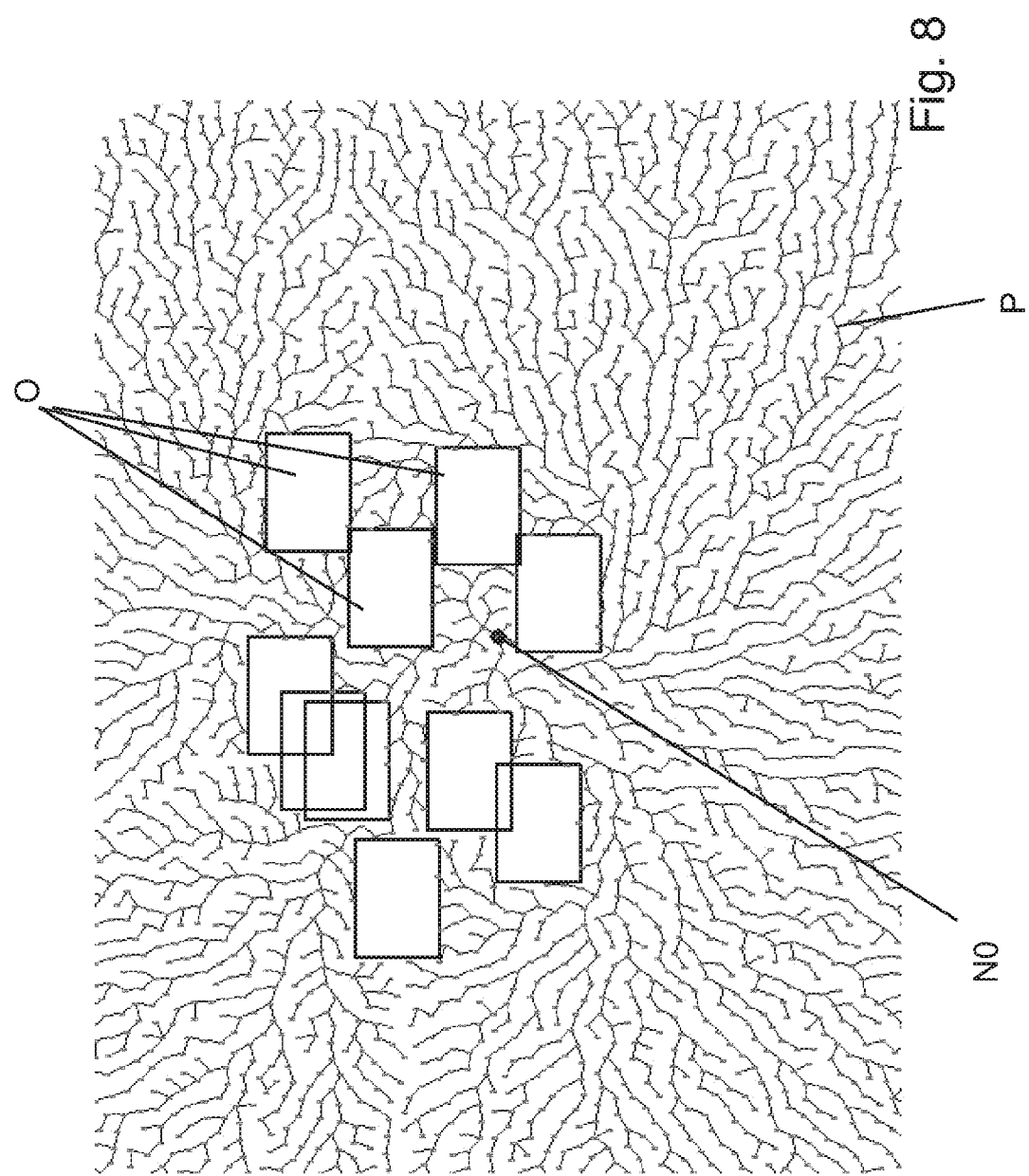
FIG. 8 shows a used case for the method according to a third embodiment of the present invention.

FIG. 8 shows a use case for the method according to a third embodiment of the present invention. In FIG. 8 the use case of a local growing tree for area covering is shown. The underlying area covering problem is an extension of the general path planning problem. Here the obstacle free space starting from an initial state should be approximately covered. Since here the cost between different paths is not relevant the cost can be set identical for each path, only the connectivity of their exploring paths is important. At each iteration all neighbor nodes are preferably stored and new nodes are avoided to be added when they are neighbors at a distance closer than the minimum radius $R_{min}$. At the end of the exploration of the free space where no new node can be added anymore, a Hamiltonian cycle or Travel Salesman problem can be formulated and resolved from the starting point on the generated graph. The minimum Radius $R_{min}$ is preferably set half the distance between their covering paths. A queue can be used to explore the space with a spherical shape so that it could be stopped at a certain distance from the starting point. To speed up the area covering, the queue could be replaced by a first in first out FIFO or a last in first out LIFO data structure as a list.

Figure 9:
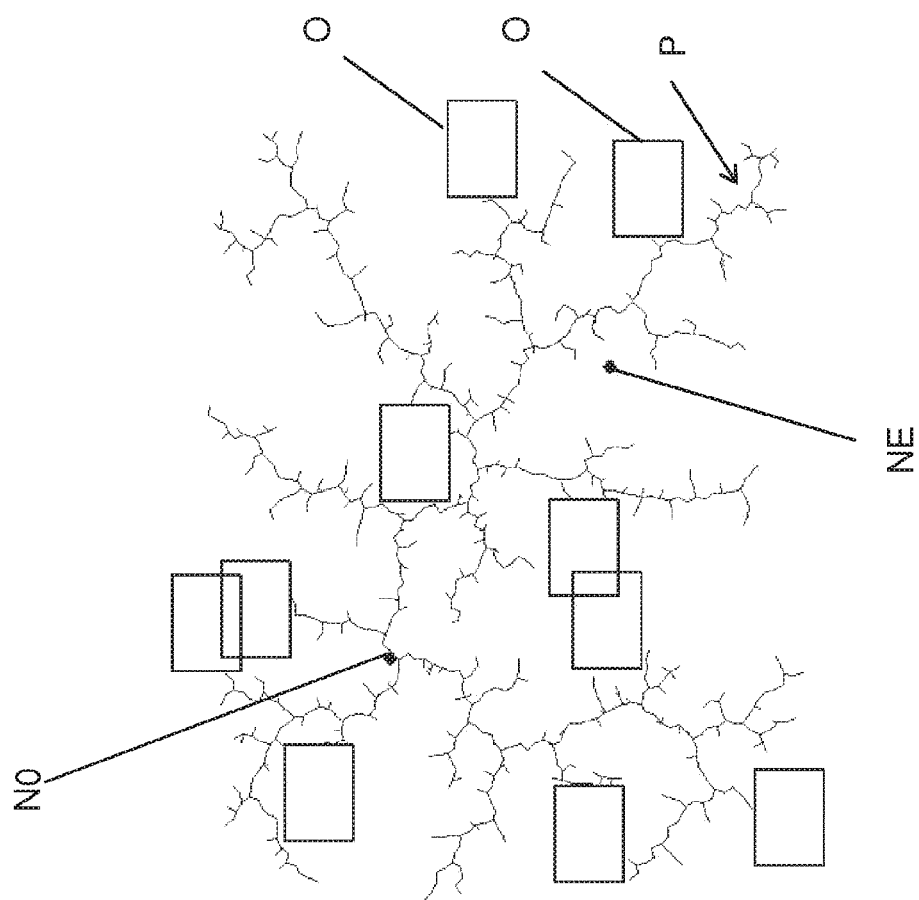
FIG. 9 shows a result of a conventional rapid-exploring random tree method.
Figure 10:
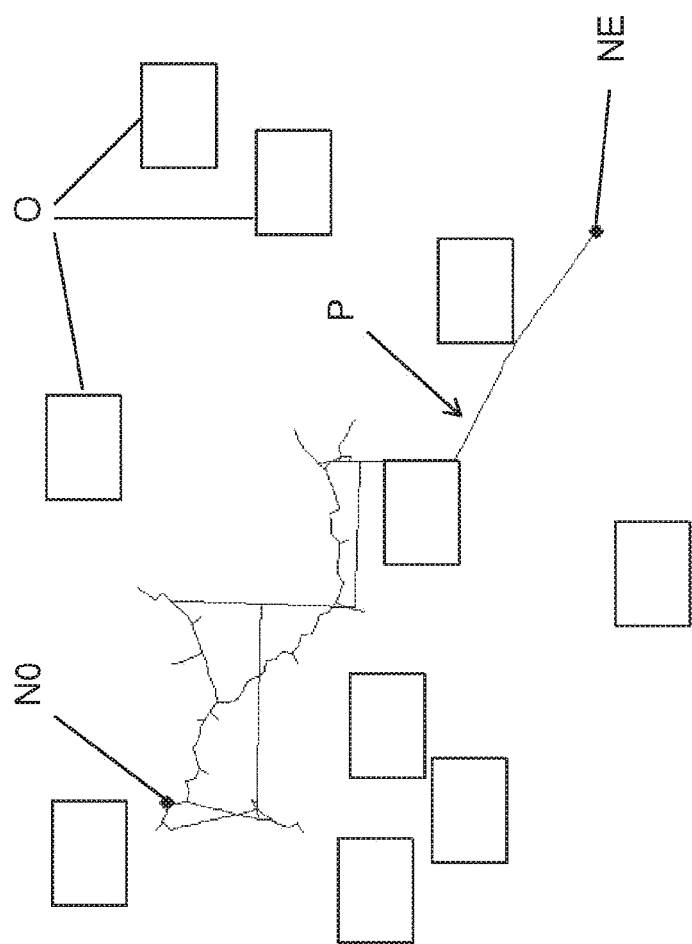
FIG. 10 shows a conventional connected rapid-exploring random tree method.

FIG. 9 shows a result of a conventional rapid-exploring random tree method and FIG. 10 shows a conventional connected rapid-exploring random tree method. In FIG. 9 a conventional rapid-exploring random tree RRT method and in FIG. 10 a connected rapid-exploring random tree C-RRT connect method for a scenario according to FIG. 1 is shown. Beginning from the starting node N0 and with obstacles in between a path P starting from the starting node N0 to the end node NE could not be found avoiding the obstacles O.

Figure 11:
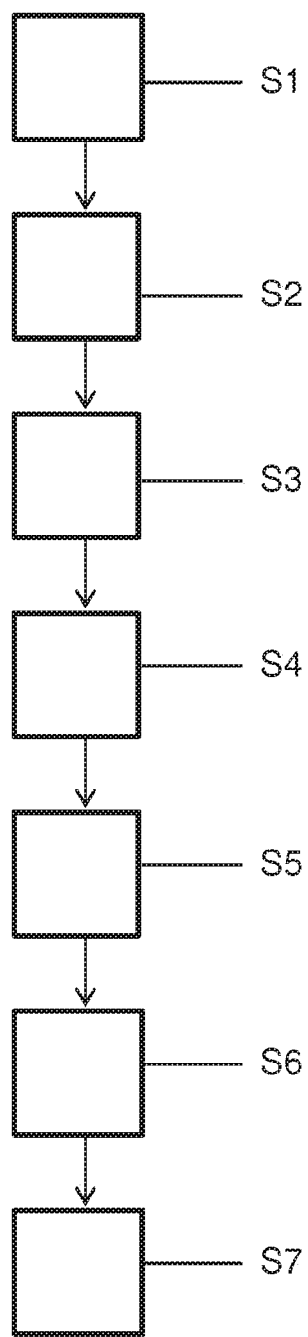
FIG. 11 shows steps of a method according to a fourth embodiment of the present invention.

FIG. 11 shows steps of a method according to a fourth embodiment of the present invention. In FIG. 11 a method according to an embodiment of the present invention is shown. In a first step S1 a plurality of child nodes to a parent node is determined, wherein the starting node representing the starting state is the parent node when step S1 is performed for the first time, and wherein the child nodes are within a certain distance to the parent node. In a second step S2 it is checked whether the transitions from the parent node to each of the child nodes are free of obstacles, and if not the corresponding child node and this partial path from the parent node to this child node is excluded. In a third step S3 a cost value for each of said partial paths is computed. In a forth step S4 said computed cost value is added to a cost value from the starting node to the parent node. In a fifth step S5 an estimated or expected cost value for the partial paths from each of the child nodes to an end node representing an end state. In a sixth step S6 the lowest overall cost value from the determined cost values according to steps d)-f) is determined and the child node as new parent node associated with the determined lowest cost is selected. In a seventh step S7 the steps S1-S6 are performed repeatedly until at least one termination condition is fulfilled including the termination condition if a selected child node is within a pregiven distance to the end node.

Figure 12:
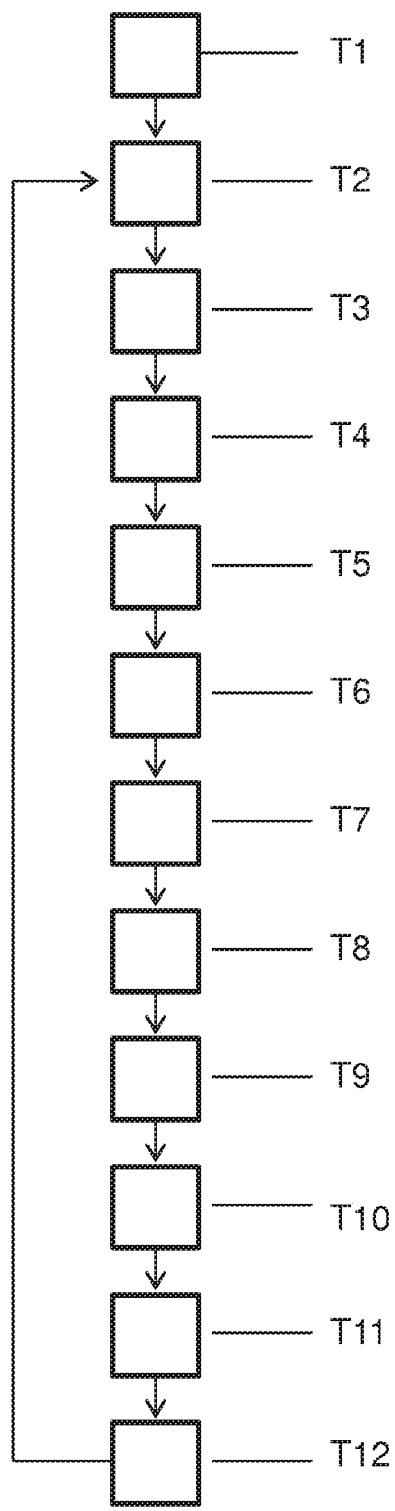
FIG. 12 shows steps of a method according to a fifth embodiment of the present invention.

FIG. 12 shows steps of a method according to a fifth embodiment of the present invention. In FIG. 12 steps of a method according to a further embodiment of the present invention are shown. In a first step T1 the start node in inserted into a priority queue. In a second step T2 the node is extracted from the priority queue which expects the lowest cost. In a third step T3 local sphere covering child nodes of radius $R_{min}$ are generated in the sphere of radius $R_{max}$. In a fourth step T4 it is checked if the transition from the current parent node to one of the child nodes is free of obstacles. In a fifth step T5 the cost is computed from the start node to the current parent node by adding the parent cost and the connecting cost from the current parent node to the child node. Further the expected cost is computed by adding the cost $h(x, x_f)$ to the destination/end node and the cost of the current node. In a sixth step T6 the closest node or nodes with regard to the current node are determined. In a seventh step T7 it is checked whether the closest node is closer than $R_{min}$ to the current node and if yes the cost from the closest node and the cost from the current node are checked and if the cost from the current node is higher than that of the closest node the current node is reinserted into the priority queue and then the parent node is the determined closest node. In an eighth step T8 if no neighbor node or nodes are found within the radius $R_{min}$ the cost of the current node is computed and added to the priority queue and the current node is added to the path and the path is updated. In a ninth step T9 all neighbor nodes within the radius $R_{max}$ are determined. In a tenth step T10 for each of the determined neighbor nodes their costs are checked against the determined cost of the new child node plus the cost for the connection from the new node to the neighbor node. In an eleventh step T11 if the cost of the new node is lower than that of the parent node the parent node is reinserted into the priority queue and the overall cost of the path is updated and the path in the tree is visited in a breadth-first search way to update the cost of the connected nodes. In a twelfth step T12 steps T2-T11 are iterated as long as until the priority queue is empty or the maximum number of iterations or the destination set/end node is reached.

In summary embodiments of the present invention can enable discovery with bounded error optimal cost of obstacle free state space paths by maintaining the costs to the current visited node and selecting the most promising node using a lower bound cost function and performing a probabilistic local exploration. Further embodiments of the present invention can enable exploration of the free space with spheres of radius according to a prescribed probability distribution. Even further embodiments of the present invention can enable use of an expected cost to compute a lower bound of the real cost to achieve the bounded optimal solution. Even further embodiments of the present invention can enable exploration of the free space using a priority queue or sorting data structure. In particular embodiments of the present invention can enable a re-optimization of the exploring path tree by checking nearby nodes and by updating the cost in a forward way. Even further embodiments of the present invention can enable to doubly progress start and end nodes in the discovery of the path in the obstacle free state space. Even further embodiments of the present invention can enable consideration of time, i.e. the time axis in the state space without adding a full continuous additional dimension to the state space by defining obstacle free time intervals and by checking while progressing in the feasibility of moving from one interval to the other collision free time interval in the new state.

Embodiments of the present invention can provide the following:

1. A system to compute a bounded approximation optimal solution for a path planning problem that avoids obstacles by using a priority fast local growing tree structure.
2. A system that computes a cooperative path planning using a local growing tree structure.
3. A system that computes an area covering path by first exploring the free area with sphere of prescribed density radius and then computing a Hamiltonian cycle on the resulting graph.
4. A method that computes cooperative and distributed path planning by iteratively find a solution per each moving object like a vehicle while the others are fixed and by defining a common objective function that include the cost of interaction that is decreasing with the increase of the distance among mobbing objects, like a vehicle or robot.

5. A method that computes an area covering path for a moving object/vehicle/robot by first exploring with spheres of prescribed distribution radius and with a local priority data structure and then computing an Hamiltonian Cycle/Travel Salesman problem on the resulting graph To summarize an embodiment of the present invention provides a method for computing a planning path for moving objects/vehicles/robots including a computation of a cooperative path and resolving the problem of area covering computation preferably comprising the steps of 1. Local growing tree/graph with optimal cost computation and using spheres of equal radius according to a prescribed probability distribution.
2. A priority data structure that allows to explore the free space with bounded optimal cost for avoiding unpromising solution areas.
3. A lower bound cost function that allows to explore the free space only for solution that are not suboptimal.

Embodiments of the present invention have inter alia the following advantages: The embodiments of present invention can enable a bounded error cost avoiding to explore non-interesting areas of the free space. Further embodiments of the present invention can guarantee with their priority queue a bounded optimality of the solution and enables a limited number of iterations to the bounded error optimal solution.

Embodiments of the present invention can guarantee that the path is found after a bounded number of steps and with a path that has a bounded error from the optimal solution if the radius of the exploration is ½ the smallest passage between obstacles. Embodiments of the present invention can provide a fast and error bounded solution to the path planning problem and extensions.

Embodiments of the present invention further can be applied to a large number of different applications ranging from medical, robot movement, drones, autonomous driving vehicles, cooperative vehicles, precise control, computer animation, navigation, computer simulation, game production, military and space, see and channel navigation, agricultural and mining unmanned vehicle application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for traversing, by an object, an obstacle free path from a starting point represented by a starting node to an end point represented by an end nod, the method comprising:
   determining, by one or more processors, the obstacle free path from the starting point to the end point, by a method comprising:
   a) determining a plurality of secondary intermediate points represented by child nodes, the secondary intermediate points being between a primary intermediate point represented by a parent node and the end point, wherein the primary intermediate point is between the starting point and the end point, and wherein the plurality of secondary intermediate points are within a first threshold distance from the first intermediate point,
   b) checking whether secondary partial paths from the parent node to each of the child nodes are free of obstacles and excluding secondary partial paths that are not free of obstacles,
   c) computing a cost value for each of the non-excluded secondary partial paths,
   d) adding the computed cost value to a cost value for a primary partial path from the starting node to the parent node,
   e) adding an estimated or expected cost value for a partial path from each of the child nodes to the end node,
   f) determining a lowest overall cost value from the cost values determined according to d)-f) and selecting a child node associated with the determined lowest overall cost value as a new parent node, and
   g) repeatedly performing steps a)-f) until at least one termination condition is fulfilled, wherein the at least one termination condition includes the selected child node representing a secondary intermediate point within a second threshold distance to the end point; and
   controlling the object so as to cause the object to travel from the starting point to the end point along the determined obstacle free path.

2. The method according to claim 1, wherein a lower bound value for the real cost from a child node to the end node is determined and used as the estimated or expected cost value in step e).

3. The method according to claim 1, wherein for determining the plurality of child nodes a parent covering space is selected and the plurality of child nodes are generated locally such that the plurality of child nodes cover the parent covering space with their individual covering spaces to a predetermined parent extent, wherein the individual covering spaces do not overlap with each other.

4. The method according to claim 1, wherein a form of the individual covering space for all the plurality of child nodes and/or the parent covering space for the parent node is spherical form having a predefined radius.

5. The method according to claim 3, wherein for generating the plurality of child nodes locally a limited number of directions from a center of the parent covering space is generated and used for covering the parent covering space by generating the plurality of child nodes in these directions.

6. The method according to claim 1, wherein for step b) in case of a determined obstacle, the plurality of child nodes are generated within a parent covering space such that a part of the parent covering space being free of the obstacle is covered at least in part.

7. The method according to claim 1, wherein for step b) in case of two or more determined obstacles, a minimum obstacle distance is determined between the two or more determined obstacles and a maximum extent in the direction of a minimum distance of the individual covering space is set below the minimum obstacle distance.

8. The method according to claim 1, wherein a closest node to the parent node is determined and if the closest node lies within an individual covering space of a child node centered at the parent node the overall cost value including the cost for the partial path from the current parent node to the closest node for the closest node is determined and if the cost is lower than the overall cost of the parent node, then the closest node is selected as a new parent node.

9. The method according to claim 1, wherein parameters defining a shape of a parent covering space and/or an individual covering space, are determined randomly.

10. The method according to claim 7, wherein in case of spheres as individual covering spaces and/or parent covering spaces a corresponding radius' is determined to be lower than half the minimum distance between the two or more obstacles.

11. The method according to claim 1, wherein for implementing a time evolution of obstacles the obstacles and the plurality of child nodes along the path are implemented with a further dimension in time.

12. The method according to claim 1, wherein for step b), a time evolution of obstacles is accounted for by assigning, to each respective one of the plurality of secondary partial paths, a time interval indicating a time during which the respective secondary partial path is free of obstacles.

13. The method according to claim 1, wherein when an evolution from the starting node to the end node is kinodynamic-based, the cost value for each of the non-excluded secondary partial paths is computed by performing a local optimization task.

14. The method according to claim 1, wherein steps a)-g) are also performed in a reverse manner starting from the end node as an initial parent node backwards to the starting node, wherein the termination condition is fulfilled when nodes of both paths, one originating at the starting node and the other originating at the end node are within a threshold distance to each other.

15. The method according to claim 14, wherein for implementing a time evolution of nodes and obstacles, time is subtracted to account for reverse time direction.

16. The method according to claim 1, wherein for each new parent and/or child node, nodes are added along a direct path to the destination and the termination condition is only applied when the end node is reached by a partial path with steps a)-g) performed and the new parent node being a node representing the end point.

17. The method according to claim 1, wherein in case a path from the starting node to the end node is found within a time boundary, a remaining time is used applying an RRT*-procedure for checking alternative paths with lower cost.

18. The method according to claim 1, wherein in case of multiple objects steps a)-g) are performed for a first object and then the steps a)-g) are performed for one or more second objects considering the determined path for the first object fixed to be an obstacle and wherein a common overall cost is determined.

19. The method according to claim 1, wherein the common overall cost includes an interaction cost between a first and second object.

20. The method according to claim 1, wherein a center of an individual covering space and/or a parent covering space is assigned to a grid structure.

21. The method according to claim 1, wherein a threshold is used to specify how many nodes need to be connected to obtain a path from the starting node to the end node.

22. The method according to claim 1, wherein a queue is used to indicate expected cost values for each node, such that a node with a lowest expected cost value is used as a next node and other nodes with a higher cost are ordered according to their expected cost value in the queue.

23. The method according to claim 22, wherein for performing step b)-f), an overall cost value for paths via each child node is subsequently determined, and if an overall cost value via a current child node is less than that of a prior child node, then a current child node is selected as a new parent node and a prior child node is reinserted into the queue.

24. The method according to claim 22, wherein for performing step a) the starting node is inserted into the queue.

25. A system for controlling an object so as to cause the object to travel along an obstacle free path from a starting point represented by a starting node to an end point represented by an end node, the system comprising:
one or more processors adapted to:
determine the obstacle free path from the starting point to the end point, by:
a) determining a plurality of secondary intermediate points represented by child nodes, the secondary intermediate points being between a primary intermediate point represented by a parent node and the end point, wherein the primary intermediate point is between the starting point and the end point, and wherein the plurality of secondary intermediate points are within a first threshold distance from the first intermediate point,
b) checking whether secondary partial paths from the parent node to each of the child nodes are free of obstacles and exclude secondary partial paths that are not free of obstacles,
c) computing a cost value for each of the non-excluded secondary partial paths,
d) adding the computed cost value to a cost value for a primary partial path from the starting node to the parent node,
e) adding an estimated or expected cost value for a partial path from each of the child nodes to the end node,
f) determining a lowest overall cost value from the cost values determined according to d)-f) and selecting a child node associated with the determined lowest overall cost value as a new parent node, and
g) repeatedly performing steps a)-f) until at least one termination condition is fulfilled, wherein the at least one termination condition includes the selected child node representing a secondary intermediate point within a predetermined distance to the end point, and
control the object so as to cause the object to travel from the starting point to the end point along the determined obstacle free path.

* * * * *